(12) United States Patent
Fischer et al.

(10) Patent No.: US 7,071,247 B2
(45) Date of Patent: Jul. 4, 2006

(54) REINFORCED FILTER MATERIAL

(75) Inventors: Hartmut Rudolf Fischer, Mierlo (NL); Lawrence Fabian Batenburg, Eindhoven (NL); Leonardus Johannus Maria Dortmans, Helmond (NL)

(73) Assignee: Nederlandse Organisatie Voor Toegepast-Natuurwetenschappelijk Onderzoek TNO, VK Delft (NL)

( * ) Notice: Subject to any disclaimer, the term of this patent is extended or adjusted under 35 U.S.C. 154(b) by 350 days.

(21) Appl. No.: 10/312,229

(22) PCT Filed: Jul. 2, 2001

(86) PCT No.: PCT/NL01/00495

§ 371 (c)(1),
(2), (4) Date: Mar. 28, 2003

(87) PCT Pub. No.: WO02/00776

PCT Pub. Date: Jan. 3, 2002

(65) Prior Publication Data

US 2003/0162878 A1    Aug. 28, 2003

(30) Foreign Application Priority Data

Jun. 30, 2000    (EP) .................. 00202310

(51) Int. Cl.
*C08J 9/00*    (2006.01)
*C08J 9/35*    (2006.01)
*C04B 33/00*   (2006.01)
*C08K 3/34*    (2006.01)

(52) U.S. Cl. .................. 523/218; 523/216; 524/445; 501/145; 501/147; 501/148

(58) Field of Classification Search .......... 524/445, 524/447; 501/145, 147, 148; 523/218, 216
See application file for complete search history.

(56) References Cited

U.S. PATENT DOCUMENTS

| | | | |
|---|---|---|---|
| 5,033,950 A | * | 7/1991 | Will ................... 425/84 |
| 6,451,897 B1 | * | 9/2002 | Niyogi ................ 524/445 |
| 6,579,927 B1 | * | 6/2003 | Fischer ............... 524/445 |
| 6,759,446 B1 | * | 7/2004 | Lee et al. ............ 521/83 |
| 6,767,951 B1 | * | 7/2004 | Nair et al. ........... 524/445 |
| 6,767,952 B1 | * | 7/2004 | Dontula et al. ....... 524/445 |
| 6,770,696 B1 | * | 8/2004 | Ko et al. ............. 524/445 |
| 6,812,272 B1 | * | 11/2004 | Fischer ............... 524/445 |
| 6,818,163 B1 | * | 11/2004 | Fibiger et al. ........ 264/51 |
| 6,870,011 B1 | * | 3/2005 | MacQueen et al. ..... 525/408 |

FOREIGN PATENT DOCUMENTS

| | | |
|---|---|---|
| DE | 198 42 845 A1 | 4/1999 |
| EP | 0 516 299 A1 | 12/1992 |
| JP | 55116743 | 9/1980 |
| WO | WO 99/07790 | 2/1999 |
| WO | WO 00/34393 | 6/2000 |

* cited by examiner

Primary Examiner—Tae H. Yoon
(74) Attorney, Agent, or Firm—Lucas & Mercanti, LLP

(57) ABSTRACT

The invention relates to a porous mold for use in a pressure casting process, which mold is manufactured of a polymeric material forming a matrix into which a clay and a block copolymer or a graft copolymer have been incorporated, wherein the block copolymer or graft copolymer comprises one or more first structural units (A), which are compatible with the clay, and one or more second structural units (B), which are compatible with the polymeric matrix. The invention further relates to a process for producing said mold and to the use of said mold in a pressure casting process.

20 Claims, No Drawings

REINFORCED FILTER MATERIAL

This patent application claims a benefit of priority from European Patent Application No. 00202310.9 filed Jun. 30, 2000 through PCT/NL01/00495 filed Jul. 2, 2001, the contents of each of which are incorporated herein by reference.

The invention relates to a filter material, to a process for preparing said filter material and to its use in the manufacture of filter devices, membranes, porous molds and the like.

Filter materials are used in numerous applications. Principally, a filter material is designed such that it has a certain degree of porosity and specific pore size. As a result, a material that is passed through it will be separated into two fractions, one that is capable of being transported through the pores in the filter material, and one that is not.

An important application of filter materials is their use for the manufacture of porous molds for the production of ceramic bodies, such as sanitary devices.

In order to keep their weight within reasonable boundaries, ceramic sanitary devices, such as toilet bowls, wash basins and the like, are typically hollow structures. In the ceramics industry, green ceramic bodies for the production of such devices are generally manufactured using a slip casting technique. In accordance with this technique, a clay-water suspension of which the ceramic device is to be produced is poured into a porous mold. Water is subsequently removed from the suspension through the pores of the mold. Of course the water disappears from the outer surface of the suspension (i.e. at the boundary surface with the mold) first. The farther to the center of the suspension, the later the suspension will dry. Thus, by allowing the water transport to take place for a suitably chosen period of time, a desired thickness of the hollow ceramic body is attained. The remainder of the suspension, which is still wet, may be removed from the insides of the hollow body by pouring.

Historically, the driving forces that were relied on for the displacement of the water from the suspension within the mold to the pores of the mold were simple diffusion and capillary action. The molds used in the slick casting were made of gypsum. Gypsum is a material which is highly porous, thus allowing diffusion of the water from the suspension to the pores.

In the pursuit of enhancing productivity, a slick casting technique has been developed wherein pressure is employed to drive out water from the suspension into the pores of the mold. This type of slick casting is generally referred to as pressure casting. The use of pressure reduces the process time required per hollow green body from about 1–2 days to 10–20 minutes. Accordingly, a much higher turnover and/or shorter cycle time has been achieved.

Gypsum has been found unable to withstand the pressures involved in pressure casting. The molds experience a change of pressure, and thus considerable distortions, in short cycle times over a substantial period of time. Therefore, they need to be of a material having an intrinsically high stiffness and low flow/creep characteristics. So far, the material used is a porous polymer, principally poly(methylmethacrylate) (PMMA).

A disadvantage of the materials used in industrial processes for the production of molds for pressure casting is that they have a rather low strength in bending mode. They further exhibit a flow deformation behavior which changes over time. The maximum number of production cycles in pressure casting processes using molds of these materials is therefore not satisfactory. Although attempts have been made to reinforce the polymer materials with traditional elements of composite materials, these attempts have failed because they have been found to result in a severe deterioration or even a complete destruction of the porous structure of the material, which is essential for the operability of the mold.

The present invention seeks to provide a filter material that does not have the disadvantages of the known filter materials, such as those outlined above. In particular, it is an object of the invention to provide a material suitable for producing a strong mold for pressure casting which has a very high mechanical strength allowing the mold to withstand the conditions of the pressure casting process in an optimal way, leading to an increased lifetime and use in an increased number of production cycles in comparison with the known molds. It is further an object of the invention to provide a mold for pressure casting which has at least equally good properties (e.g. porosity) as the known molds, making their use in pressure casting processes highly advantageous.

Surprisingly, it has now been found that the above goals can be reached by incorporating a clay material in the polymeric material of the filter material in a specific manner. Thus, the invention relates to the use of a nanocomposite material comprising a polymeric matrix into which a clay and a block copolymer or a graft copolymer have been incorporated, wherein the block copolymer or graft copolymer comprises one or more first structural units (A), which are compatible with the clay, and one or more second structural units (B), which are compatible with the polymeric matrix for the manufacture of a porous filter material.

Advantageously, in a filter material according to the invention the clay material may be distributed throughout the polymeric matrix very homogeneously due to the presence of the block or graft copolymer. The particles of the clay material have the form of platelets and act as two dimensional reinforcing elements, substantially without deteriorating the other advantageous characteristics of the polymeric material of which the filter material is constructed. Even at relatively low amounts of clay material, a significant improvement in mechanical properties has been observed. In addition, the temperature stability and the creep properties of the filter material are improved, while the porosity characteristics are essentially retained.

Due to the improved mechanical properties, the filter material is highly useful for manufacturing a porous mold for pressure casting, which mold is capable to withstand much higher pressures during use in a casting process, leading to a reduced process time per green body. In addition, the porous mold has an increased lifetime due to its improved mechanical strength. Furthermore, a porous mold may have certain highly complex shapes which were unattainable when the mold was manufactured of conventional materials, due to the improved stiffness of the material of which a porous mold according to the invention is prepared.

As has been indicated above, an important aspect of the invention is the finding that the properties of filter materials can be significantly improved by incorporation of a clay material. These advantages become apparent when the filter material is used in the manufacture of inter alia porous molds for pressure casting, filter devices, and membranes. Herein below, the advantages of the invention and the preparation and nature of the nanocomposite material used in the manufacture of filter materials according to the invention will be discussed with reference to porous molds for pressure casting. This is in no way to be explained as limiting the scope of the invention to porous molds only. Many applications of the present filter material are possible, as will be readily acknowledged by the skilled artisan.

As has been mentioned, a filter material according to the invention is porous. This allows for its use in inter alia porous molds for pressure casting processes. In principle, the porosity may be of any desired extent necessary for the casting process. Typically, the porosity will be between 15 and 45%. The porosity may be measured by water uptake of dry material or by Hg-porosimetry. The average size of the pores preferably is between 0.2 and 100 µm.

The polymeric material that is used for forming a matrix may be any polymeric material that has been proven a suitable material per se for the production of porous molds for pressure casting. In this regard, reference is made to the German patent applications 1 35 952, 19 28 026, and 41 17 745, in which exemplary descriptions may be found of the conventional production of porous molds for pressure casting. Materials that are preferred are epoxy resins, poly(meth)acrylates, such as poly(methylmethacrylate) (PMMA), polyurethanes, polyesters, vinyl polymers, such as polystyrene, and the like, Particularly good results have been obtained with PMMA, as this material seems to experience the benefits of the incorporation of the clay material especially.

In a preferred embodiment, at least a part of the polymeric material has a spherical or near-spherical shape. The size of the spheres is preferably between 10 and 1500 µm (diameter). In accordance with this embodiment, it is preferred that an adhesive is present, which ensures that a good adherence of the polymeric spheres is attained, thereby forming the (porous) polymeric matrix. Suitable adhesives may be chosen by the skilled person dependent on the nature of the polymeric material and based on his normal knowledge of polymeric materials. Preferably, the adhesive is a material that may be polymerized in an emulsion or suspension polymerization reaction. For instance, when the polymeric material is PMMA, the adhesive may suitably be a mixture of methylmethacrylate and styrene. The amount in which the adhesive is present preferably lies between 5 and 40 wt. %, relative to the amount of polymeric material.

The clay material may be of a natural or synthetic nature. Preferably, the clay has a large contact surface. Very suitable are clay types based on layered silicates, such as layered phyllosilicate composed of magnesium and/or aluminum silicate layers which are each about 7–12 Å in thickness. Especially preferred are smectite-like clay minerals, such as montmorillonite, saponite, hectorite, fluorohectorite, beidellite, nontronite, vermiculite, halloysite and stevensite. These materials impart very favorable mechanical properties and a great heat resistance to a porous mold.

A suitable clay type has a cation exchange capacity of from 30 to 250 milliequivalents per 100 gram. When this capacity exceeds the above upper limit, it proves difficult to finely disperse the clay on a molecular level because of the strong mutual interaction of the clay layers. When the cation exchange capacity is lower than the above lower limit, it turns out that the clay is hard to modify, owing to the fact that the interaction with the block copolymer or graft copolymer is small. There is preferably used a clay having a cation exchange capacity of from 50 to 200 milliequivalents per 100 gram.

Besides the clay described before and the polymeric matrix, a porous mold according to the invention is further based on a block copolymer or a graft copolymer. This block copolymer or graft copolymer is a polymer comprising first structural units (A), which are compatible with the clay, and one or more second structural units (B), which are compatible with the polymeric matrix. When the structural units occur in a straight polymeric chain, reference is made to a block copolymer. When the structural units (A) occur in a chain which is a branch of the chain in which the structural units (B) occur, or vice versa, reference is made to a graft copolymer.

The structural units (A) are compatible with the clay. By this is meant that these units in themselves, i.e. not in the copolymeric form with the structural units (B), are excellently mixable with the clay. The structural units (A) are preferably of a hydrophilic nature. Materials suitable as structural units (A) are polyvinylpyrrolidone, polyvinyl alcohol, polyethylene oxide, linear or dendritic polyethylenimine, polyoxymethylene, polytetrahydrofuran, polyacrylic acid, polymethacrylic acid, polydimethylacrylamide, polymethylacrylamide, copolymers of acrylic acid or methacrylic acid and acrylamide, polyisopropylamide, starch, polysaccharides and cellulose derivatives. It is preferred that at least one of the structural units (A) is derived from monomeric units selected from the group of vinylpyrrolidone, vinyl alcohol, ethylene oxide, ethylenimine, vinylpyridine, acrylic acid and acrylamide. These preferred units (A) are excellently compatible with a clay.

Very suitable materials for use as structural units (A) have a molecular weight of from 100 to 5,000, preferably from 1,000 to 3,000. It is also advantageous when the material of the structural units (A) contains from 5 to 20 monomeric units.

The structural units (B) are compatible with the polymeric matrix. By this is meant that these units in themselves, i.e. not in the copolymeric form with the structural units (A), are excellently mixable with the material of the polymeric matrix. It is also possible that the nature of the structural units (B) is the same as the nature of the polymeric matrix. An example is a polymeric matrix of polyethylene having a molecular weight of 5,000 and structural units (B) of polyethylene having a molecular weight of 2,500. It is even possible that the material of the polymeric matrix is exactly equal to that of the structural units (B). In the above example, the structural units (B) could then be of polyethylene having a molecular weight of 5,000.

The nature of the structural units (B) will depend on the nature of the polymeric matrix. Materials suitable as structural units (B) are, e.g., polyolefins, such as polyethylene or polypropylene, vinyl polymers, such as polystyrene or polymethyl methacrylate, polyesters, such as polyethylene terephthalate or polycaprolactone, polycarbonates, polyaryl ethers, polysulfones, polysulfides, polyamides, polyetherimides, polyether esters, polyether ketones, polyether ester ketones, polyvinyl chloride, polyvinylidene chloride, polyvinylidene fluoride, polysiloxanes, polyurethanes and polyepoxides. There are preferably used polyolefins, vinyl polymers, polyesters, polyethers, polysiloxanes or acrylic polymers.

According to a preferred embodiment, a block copolymer or a graft copolymer is used in which the structural units (A) contain at least 2 monomeric units and the structural units (B) contain the same or a larger amount of monomeric units as/than the structural units (A). It has been found that with such a block copolymer or graft copolymer a very finely divided homogeneous dispersion of the clay is obtained in the polymeric matrix.

In a porous mold according to the invention, the weight ratio of the amount of block copolymer or graft copolymer to the amount of clay is preferably between 0.001:1 and 100:1, with a special preference between 0.005:1 and 0.15:1. The weight ratio of the amount of clay to the amount of polymeric matrix is preferably between 1:200 and 2:1, with a special preference between 1:50 and 1.2:1.

The invention further relates to a process for producing a porous mold as described above. It should be noted that it is possible in this connection to first bring together the clay and the block copolymer or graft copolymer or first bring together the polymeric matrix and the block copolymer or graft copolymer and only then add the required third constituent. It is further possible to simultaneously bring together all the three required constituents, namely clay, polymeric matrix and block copolymer or graft copolymer.

It is preferred, however, to first modify the clay with a block copolymer or graft copolymer of the above-described nature. The modified clay thus obtained can then be suitably mixed with a polymeric matrix. By suitably selecting the structural units (B), a skilled worker is capable of including a clay in a polymeric matrix of any desired nature.

When preparing a nanocomposite material according to the invention, in any of the above-mentioned sequences of bringing together, it is preferred to grind or pulverize the clay previously. Such a pretreatment of the clay results in an easier and better mixability of the different constituents.

The constituents of a nanocomposite material according to the invention may be brought together in any suitable manner, provided this manner gives a good mixture. Examples of methods of bringing together the constituents comprise agitation for a longer period of time and extrusion. Suitable mixing conditions depend on the nature of the selected constituents and can be easily determined by a skilled worker. The agitation may be carried out, e.g., at a temperature between 10 and 80° C.

A preferred method for producing a porous mold according to the invention involves the use of a polymeric material having a spherical or near-spherical shape and an adhesive. In accordance with this method, the clay is first modified with a desired block or graft copolymer at elevated temperature (melt) or in an aqueous suspension. Subsequently, the modified clay is swollen under employment of the adhesive and mixed with an aqueous suspension of the polymeric material, preferably partly in the form of spheres or near-spheres. In a following step, the adhesive is cured by the addition of an initiator/agitator mixture in a temperature between 10 and 80° C. without farther stirring to obtain the final porous polymer product. The product is preferably cured in the desired shape, so that no further processing step is needed.

A porous mold according to the invention is very suitable for use in pressure casting processes of any known type. As has been mentioned above, it has all the advantageous properties of the conventional polymeric type porous mold, in addition to increased mechanical strength and heat stability. Accordingly, the conditions during the pressure casting may be chosen such that a reduced process time is achieved or that the lifetime of the mold is increased. In a preferred embodiment, the porous mold has a wall thickness in the range of 1 to 40 cm.

A porous mold according to the invention is preferably used for pressure casting sanitary devices, such as wash basins, toilet bowls and the like, roof tiles, and other ceramic bodies. The pressure casting itself may be carried out in any known manner, optionally at higher pressures than usual, leading to a green body for the desired ceramic device, which may subsequently be processed further, e.g. by sintering.

As has been mentioned the above material that is described above in the manufacture of a porous mold for pressure casting may also be employed for other filtering purposes. It may for instance be used in the form of a thin film of a thickness between 0.2 and 5 mm as a membrane or supported or unsupported filter material.

The invention will now be further elucidated by the following, nonrestrictive example.

EXAMPLE 4 g of a sodium-montmorillonite (cation exchange capacity 98 mequiv./100 g) is kneaded with 4.5 g of a diblock-copolymer consisting of one polyethylene oxide block ($Mn=1000$ g/mol) and of on polymethylmethacrylate (PMMA) block ($Mn=1000$ g/mol) at 70° C. for 2 hrs. resulting in a homogeneously swollen clay. This material is mixed with 76 g of a mixture of methylmethacrylate and styrene (90:10), a small amount (0.5 g) of a polymerisation agitator (N,N dimethyltolouidine) and a small amount of a surfactant (processing aid to lower the surface tension) for about 10 min at room temperature. This suspension is added to a mixture of 300 g of polymer latex spheres (PMMA, average sphere size 40–100 microns), 2 g of a polymerisation initiator (dibenzoylperoxide) and 120 g of water, stirred for about 2 minutes and poured into a mould with the final product shape. After 30 minutes of polymerisation, the final product can be taken out of the mold and used. The product was applied as a mold for pressure casting wash basins (mold size about 100×60×40 cm). The mold proved to be suitable for use in at least 9000 casting cycles (9000 wash basins), without noticeable changes in the quality of the wash basin as compared to wash basins manufactured using conventional molds.

The mechanical properties (modulus, strength, toughness) of the reinforced material increased by 60–90% in a temperature range up 50 degrees below the glass transition temperature of the main mold material (PMMA) without any change in porosity compared to the materials not containing the clay. The lifetime of the product increased by 900–1000%.

The invention claimed is:

1. Method for manufacturing a porous filter material comprising (a) providing a nanocomposite material comprising a polymeric matrix into which a clay and a block copolymer or a graft copolymer have been incorporated, wherein the block copolymer or graft copolymer comprises one or more first structural units (A), which are compatible with the clay, and one or more second structural units (B), which are compatible with the polymeric matrix; and (b) forming the nanocomposite material into a desired shape.

2. Method according to claim 1, wherein the filter material is chosen from the group of porous mold for pressure casting, filter devices, and membranes.

3. A filter material manufactured of a polymeric material forming a matrix into which a clay and a block copolymer or a graft copolymer have been incorporated, wherein the block copolymer or graft copolymer comprises one or more first structural units (A), which are compatible with the clay, and one or more second structural units (B), which are compatible with the polymeric matrix.

4. A filter material according to claim 3, wherein the clay has a layered structure and a cation exchange capacity of from 30 to 250 milliequivalents per 100 gram.

5. A filter material according to claim 4, wherein the clay is chosen from the group consisting of layered silicates.

6. A filter material according to claim 3, wherein the clay is present in an amount of between 0.5 and 15 wt. %, based on the weight of the filter material.

7. A filter material according to claim 3, wherein the polymeric material is chosen from the group consisting of poly(methacrylates), polyurethanes, polyesters, and vinyl polymers.

8. A filter material according to claim 7, wherein the polymeric material is a poly(methylmethacrylate).

9. A filter material according to claim 8, wherein the second structural units (B) are chosen from the group consisting of polystyrenes.

10. A filter material according to claim 3, wherein the first structural units (A) are chosen from the group consisting of polyethylene oxide, and polyethylene imine.

11. A filter material according to claim 3, wherein the block copolymer or graft copolymer is present in an amount of between 5 and 60 wt. %, based on the amount of clay.

12. A filter material according to claim 3, wherein the polymeric material has a spherical or near-spherical shape, and further comprises an adhesive.

13. A filter material according to claim 3, wherein the filter material is a porous mold for pressure casting.

14. A process for producing a filter material according to claim 3, wherein the clay, the polymeric matrix and the block copolymer or graft copolymer, wherein the block copolymer or graft copolymer comprises one or more first structural units (A), which are compatible with the clay, and one or more second structural units (B), which are compatible with the polymeric matrix, are mixed together and brought into a desired shape.

15. A process according to claim 14, comprising the steps of
a) swelling the clay with the block copolymer or graft copolymer in water;
b) preparing a homogeneous mixture of the swollen clay and the block copolymer or graft copolymer;
c) adding an adhesive to the mixture;
d) adding to the mixture an aqueous suspension of the polymeric material of a spherical or near-spherical shape; and
e) polymerizing the adhesive.

16. A process according to claim 14, wherein the filter material is a porous mold for pressure casting.

17. Method for producing a ceramic green body comprising the steps of pouring an aqueous suspension in a porus mold according to claim 13, and employing pressure to drive out water from the suspension into the pores of the mold.

18. Method according to claim 17, wherein the ceramic green body is a green body for ceramic article.

19. A process according to claim 15, wherein the filter material is a porous mold for pressure casting.

20. A filter material according to claim 7, wherein said poly(methacrylate) is poly(methylmethacrylate).

* * * * *